United States Patent [19]

Vacca et al.

[11] 4,268,205
[45] May 19, 1981

[54] METHOD AND APPARATUS FOR REMOVING MATERIAL FROM THE ENDS OF A ROTARY AIR LOCK

[75] Inventors: Miguel Vacca, South Euclid; James C. Morris, Twinsburg, both of Ohio

[73] Assignee: Mayfran, Div. of Fischer Industries, Inc., Cleveland, Ohio

[21] Appl. No.: 46,239

[22] Filed: Jun. 7, 1979

[51] Int. Cl.³ .............................................. B65G 53/40
[52] U.S. Cl. .................................... 414/219; 222/368; 414/786
[58] Field of Search ............... 414/189, 219, 220, 786; 406/62–68; 222/148, 368

[56] References Cited

U.S. PATENT DOCUMENTS

| 3,556,355 | 1/1971 | Ruiz | 222/368 |
| 3,659,754 | 5/1972 | Barone et al. | 222/368 |
| 3,899,214 | 8/1975 | Stupfel | 406/65 |

OTHER PUBLICATIONS

Ducon Fluid Transport Division, Engineering Data, Features of Stream/Flow Valve Construction.

Primary Examiner—Robert G. Sheridan
Attorney, Agent, or Firm—Meyer, Tilberry & Body

[57] ABSTRACT

A rotary vane type air lock for feeding granular abrasive materials into a pressurized chamber having means to prevent the abrasive material from coming between ends of the vanes and the air lock housing. A baffle prevents impingement of the material on the vane ends just before they reach an edge of the inlet opening. A thin sheet of high velocity air directed across the vane ends blasts off any material clinging to the end before the vane end comes into pressure sealing relationship with the housing.

17 Claims, 9 Drawing Figures

METHOD AND APPARATUS FOR REMOVING MATERIAL FROM THE ENDS OF A ROTARY AIR LOCK

BACKGROUND

The present invention relates to the art of rotary air locks and, more particularly, to a method and means for removing any particulate material resting on the end of a vane before it comes into pressure sealing relationship with its sealing land.

The invention is particularly applicable to rotary air locks for feeding metallic chips into a pressurized chamber or pressurized pneumatic conveyor tube and will be described with particular reference thereto although it will be appreciated that the invention has other applications.

Rotary air locks of the type to which this invention pertains are generally comprised of a housing having an upwardly facing inlet opening and a downwardly facing outlet opening. A vaned rotor in the housing successively opens pockets between the vanes to the inlet opening where the granular material falls into the pocket under the force of gravity and then as the rotor turns, opens the pocket to the outlet opening, where the material falls by gravity into the pressurized chamber. Intermediate the inlet and outlet openings, the vane ends pass in close spaced sealing relationship with leading and trailing lands formed on the inside of the housing.

In the past difficulty has been experienced with granular material remaining on the vane ends as the vane ends come into sealing relationship with the leading land. This is particularly so when metallic chips, which are sometimes long and curly, are being handled because the chips themselves will not only rest on top of the vane ends but will also curl over the leading face of the vanes adjacent the outer edge. In such instances, the chips are not wiped off by the leading edge of the land surface and are forced between the vane ends and the land surface resulting in excessive and undesirable wear thereto.

THE INVENTION

The present invention overcomes the above referred to difficulties and others and provides an arrangement whereby the vane ends are first covered or shielded and then any chips or other granular material resting on or clinging to the vane ends are forcefully removed from the vane ends before the vane end comes into sealing relationship with its sealing land.

In accordance with the present invention, a method of preventing the granular or particulate material being handled by a rotary-vane air lock from coming between the vane ends and the lands in the housing comprising the steps of: covering up or shielding each vane end from the impingement of any more granular material thereon just before it comes into sealing relationship with the lands; and, then exerting a removing force on any particulate material which might be on the vane end at least prior to the time that the vane end comes into sealing relationship with the sealing land. The covering up or shielding may take a number of different forms such as a simple baffle in the inlet opening of the housing or by simply spacing the leading edge of the land circumferentially from the side of the inlet opening towards which the vanes move, i.e., the leading side of the opening.

The means for exerting such force may be: a brush or wiper either rotating or static; or, a blast of high velocity gas across the outer end of each vane or a blast of gas emanatig from the blade itself.

Further in accordance with the invention, there is provided in a rotary air lock comprised of: a housing having an upwardly facing inlet opening and a downwardly facing outlet opening; a vaned rotor within the housing; and, land surfaces on each side of the inlet opening adapted to be in gas sealing relationship with the vane ends, the improvement of means spaced from the leading edge of the leading land for preventing the impingement of any granular material on the vane end prior to the time that the vane end comes into sealing relationship with a land and other means at least between the first mentioned means and the leading edge of the leading land for exerting a removing force on any particulate material remaining on the vane end after it passes the first mentioned means.

For a standard rotary air lock, the first means comprises a baffle across the leading edge of the inlet opening spaced from the leading edge of the leading land. The removing means may in alternative embodiments of the invention include: a wiper blade or brush positioned between the baffle and the leading edge of the leading land; or an air nozzle arranged to project a thin sheet of high velocity air across each vane end at least after it passes the baffle. The nozzle outlet may be fixed in the housing between the baffle and the leading land or may be on the leading surface of the vanes. In both cases, the leading outer corner of each vane is radiused to cause the sheet of air to flow outwardly thereover and sweep the end clean of any particles which may cling to the vane end after it passes the baffle.

The nozzle if employed includes means for converting high pressure air on the order of 30 to 100 pounds per square inch to a thin sheet or film of air flowing at a high, preferably supersonic, velocity by passing it through a very thin, axially elongated passage so shaped at its axial edges as to create the maximum conversion of pressure energy to velocity energy. In the case of the nozzle outlet in the housing, the passage has a generally axially extending axis and just beyond the nozzle outlet there is a surface so shaped as to cause the film of air to flow generally tangentially against the vane ends. In the case of a nozzle on each vane, the outlet is adjacent the radiused vane end so that the film of air flows over and across the vane end.

The principal object of the invention is the provision of a new and improved rotary air lock having provision for preventing any of the particulate material being handled by the rotary air lock from coming between the sealing surfaces of the air lock which is simple in construction and foolproof in operation.

Another object of the invention is the provision of a new and improved rotary air lock having new and novel means for preventing the impingement of the material being handled from coming into contact with the vane ends prior to the time that the vane ends come into sealing relationship with the sealing surfaces of the air lock and means for forcefully removing any particles which might remain on the vane ends after they pass such impingement prevention means.

Another object of the invention is the provision of a new and improved rotary lock of the general type described including a baffle extending across part of the inlet opening spaced from the leading edge of the leading sealing land and means between such baffle and the leading edge for forcefully removing any particles which might remain on a vane end after it passes the baffle.

A further object of the invention is the provision of a new and improved method for preventing particulate material being handled by a rotary vane air lock from coming between the ends of the vanes and the sealing surfaces of the air lock comprising the steps of: covering or shielding the ends of the vanes before they come into sealing relationship with the leading land to prevent the impingement of particulate material thereon; and, then exerting a force on the vane ends to remove any particulate material which may remain on the vane ends after the vane ends are covered shielded.

DRAWINGS

The invention may take physical form in certain parts and arrangements of parts and certain steps and combinations of steps, preferred embodiments of which will be described in the accompanying specification and illustrated in the accompanying drawings which form a part hereof and wherein.

PREFERRED EMBODIMENTS

Figure 1:
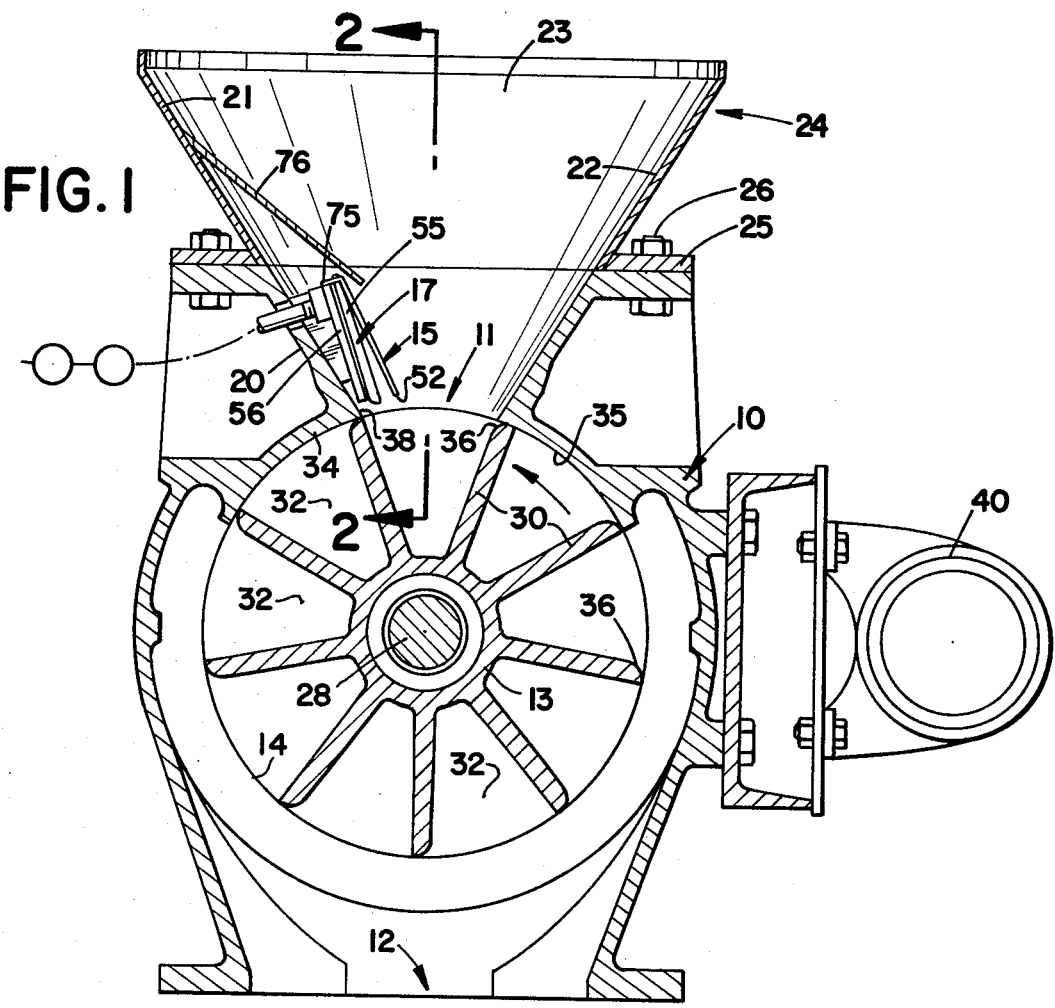
FIG. 1 is a cross-sectional view of a conventional rotary air lock modified in accordance with a preferred embodiment of the present invention.

Referring now to the drawings wherein the showings are for the purposes of illustrating preferred embodiments of the invention only and not for the purposes of limiting same, FIG. 1 shows a rotary vane air lock of generally conventional construction and comprised of: a housing 10 having an upwardly facing inlet opening 11; a downwardly facing outlet or discharge opening 12 and a central, generally cylindrical, chamber 14 in which a vane rotor 13 is rotatably supported. A baffle 15 extends across part of the side of the inlet opening 11 toward which the vane rotor is moving and means in the form of an air nozzle 17 for exerting a granular material removing force on the vane ends are positioned between the baffle 15 and the leading side of the opening.

The inlet opening 11 is generally rectangular in shape and the walls 20 of the housing above the inlet opening diverge generally upwardly and outwardly to define a funnel-shaped hopper. The upwardly diverging side walls 20 of the housing are extended by upwardly diverging leading and trailing walls 21, 2 and side walls 23 forming a hopper 24. The hopper 24 formed by these four walls is bolted to the upper end of the housing by means of a plate 25 welded to the hopper walls and fastened by bolts 26 to the upper edge of the leading and trailing inlet opening side walls generally as is shown.

In the embodiment shown, the rotor 13 is rotatably supported on a horizontal axle 28 journaled in the side wall 29 of the housing and has a plurality of radially extending vanes 30, nine being shown, with the axial ends of the vanes being integrally joined by cylindrical discs 31 to define a plurality of V-shaped pockets 32 opening radially outwardly to communicate with the inlet opening and the outlet opening during rotation of the rotor generally as shown in FIG. 1.

Figure 2:
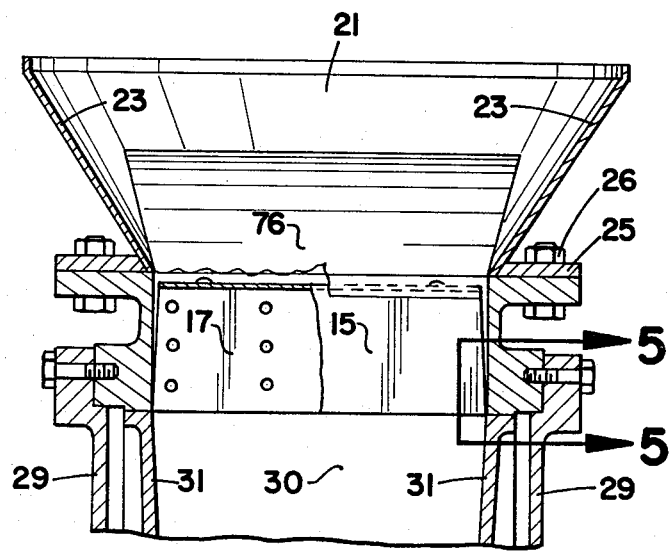
FIG. 2 is a cross-sectional view of FIG. 1 taken approximately on the line 2—2 of FIG. 1.

The housing is so formed that the trailing side of the inlet opening, there is a trailing land surface 35 and on the leading side of the opening there is a leading land surface 34, both of which have an arcuate length at least equal to the arcuate spacing between the outer ends of adjacent vanes. In accordance with the invention, the outer leading corner 36 of each vane is generally radiused through a 90° arc as shown for purposes which will be described hereinafter. The outer ends of the vanes are so dimensioned as to have a relatively close clearance, for example, 0.002 inches from the land surfaces 34, 35. Also as in conventional rotary air locks and shown in FIG. 2, the circular outer peripheries of the vane end closing discs 31 have a similar close clearance with the cylindrical chamber 14 of the housing 10. With such a close clearance, pressures in the outlet opening 12 cannot readily leak back to the inlet opening 11. It is thus possible to have the outlet opening under substantial air or gas pressure while the inlet opening is at atmospheric pressure. The rotor 13 is driven in a counterclockwise direction as viewed in FIG. 1 by means of an electric motor 40 driving the rotor through a chain and sprocket arrangement (not shown but external of the housing).

The rotary vane air lock described to here with the exception of the rounded surface 36 on the ends of each vane end, the baffle 15 and the nozzle 17 is conventional and forms no part of the present invention.

In operation, granular or particulate material is guided to the inlet opening by means of the converging side walls of the hopper and falls into whatever pocket 32 opens upwardly to the inlet opening. This particulate material is then rotated with the rotor 13 and when the pocket faces downwardly, the material falls out under the force of gravity and can then be conveyed through a pneumatic conveyor arrangement (not shown) positioned below the air lock.

As above pointed out, one of the problems with such rotary air locks has been that the particulate material being handled has clung to the exposed outer ends of each rotor vane such that when the rotor vane came opposite the leading land, the particulate material was caught between the land and the vane, resulting in a wearing of either or both the land and the vane end. In this respect, it will be noted that through the arc of movement when any one vane end is exposed to the inlet opening, its upper surface (if square to the vane sides as in the prior art) would be generally horizontal and any particles could readily remain on the upwardly facing end as it moved into sealing relationship with the land. Heretofore, the wiping action of the leading edge of the land on such particles was depended upon to remove the particles from the vane end. However, in some instances, particularly in the event of long curly chips, the chips tended to overlap the end of the vane such that they would not wipe free readily and damage to the vane end and the land resulted.

In accordance with the present invention, means are provided for preventing the impingement of any such particles on each vane end for a short distance in its arc movement before such vane end comes into sealing relationship with the leading land 34. Such means may take a number of forms such as spacing the leading edge 38 if the leading land 34 from the leading side of the inlet opening in the direction of rotation of the rotor but in the embodiment of the invention shown, such means is the baffle 15 mounted in the leading side of and extending axially across the inlet opening 11 with its lower edge 52 spaced a small distance (in a direction opposite to rotation) from the leading edge 38 of the land 34 and just radially outwardly of the path of movement of the vane ends. In this way, the upwardly facing end of each vane for a portion of its arc of rotation before it comes into engagement with the leading edge of the land 34 is prevented from having any particulate material fall thereon. During this arc of movement, second means are provided for exerting a removing force on any particles which might be clinging to the vane end after it passes the lower end 52 of the baffle.

Such latter means may take a number of different forms such as a flexible blade or brush, either fixed or rotatable, but in the preferred embodiment of the invention is a thin sheet 54 of high velocity air (see FIG. 5) flowing over the vane end. Such thin sheet of air may be provided in a number of different ways but in the preferred embodiment is the nozzle 17 positioned between the baffle 15 and the leading side of the inlet opening 11. Such nozzle 17 in the embodiment shown is comprised of leading and trailing flat plates 55, 56 closely spaced from each other by shims to form three nozzle passages 57 each having a generally radially extending axis and an outlet 58 adjacent to the path of movement of the vane ends. The shims include an outer inverted U-shaped shim comprised of two legs 62, 63 between the axial ends of the plates 55, 56 and a base 64 between the upper edges of the plates, and a pair of intermediate shims 59, 60 equally spaced between the two outer legs 62, 63. The trailing plate 56 adjacent to but spaced from its upper edge has an axial groove 65 in its face opposed to the plate 55 forming a manifold extending across the length of the plate and communicating with the space between the two plates. Air under pressure is supplied to this manifold 65 by a pair of axially spaced pipes 70 which extend outwardly through the leading side wall 20 of the housing 10 and then communicate to a source of high pressure air (not shown) through a filter (not shown) and a water separator (not shown).

Because air when it expands in the nozzle passage is substantially cooled and any humidity in the air tends to condense out, this can cause rust. Accordingly, the pipe and plates are formed of non-rusting materials such as stainless steel for the plates and brass for the pipes.

Figure 3:
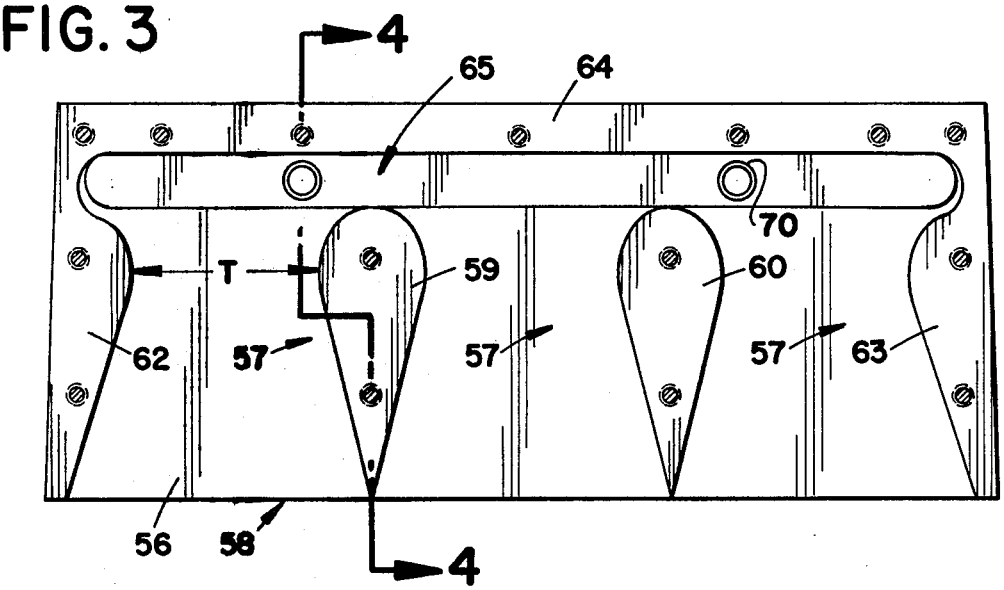
FIG. 3 is an enlarged internal view of the nozzle shown in FIG. 1 taken approximately on the line 3—3 of FIG. 4 showing the shaping of the shims to effect a maximum conversion of pressure energy to velocity energy.
Figure 4:
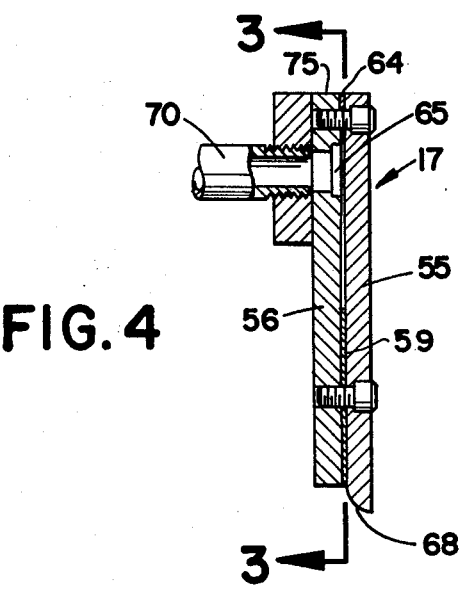
FIG. 4 is a cross-sectional view of FIG. 3 taken approximately on the line 4—4 thereof.

As shown in FIG. 3, the shims are so shaped as to define three convergent-divergent nozzle passages 57 leading from the manifold 65 to the lower edge of plate 56, each passage having a thickness equal to the thickness of the shims and an axial width which first decreases to a throat T and then increases in a generally uniform manner to the lower end of plate 56. The shape of the shims and passages are such as to convert air pressure in the manifold 65 to a maximum air velocity at the outlet 58 of the nozzle passage.

The shims may have any desired thickness but in the embodiment shown have a thickness of approximately 0.002 inches, it having been found that such thickness provides a thin sheet of air moving at extremely high velocities. The exact shape of the shims forms no part of the present invention and for a design of the exact shape, reference is made to conventional text books on nozzle design. The shape of the nozzle passages 57 is preferably optimized for the lowest air pressure to be expected in an industrial air supply system. The efficiency of the nozzle 17 is lower at the higher air pressures but as the amount of air used is small in any vent, this is not considered detrimental.

Figure 5:
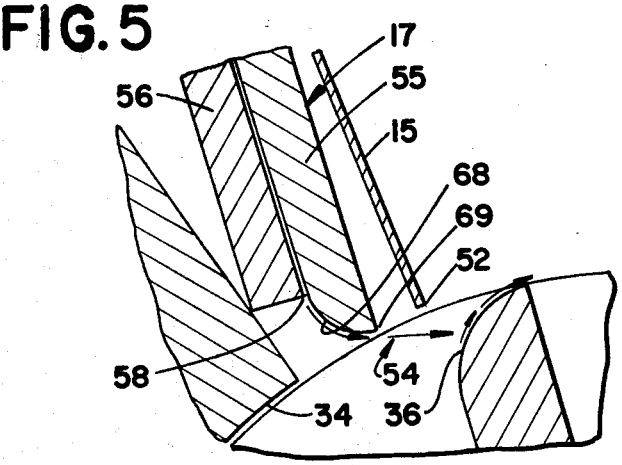
FIG. 5 is an enlarged cross-sectional view of FIG. 2 taken approximately on the line 5—5 thereof, particularly showing the path of the thin sheet of air emanating from the nozzle across the outer end of a rotor vane.

In accordance with the invention, the lower end of the leading plate 55 extends beyond the lower end of the trailing plate 56 and the lower trailing corner of the leading plate 55 is radiused as at 68 through generally a full 90° arc such that the air 54 issuing from the discharge end 58 of the nozzle 17 will cling to the radiused surface and change its direction by virtue of wall attachment effect and flow generally tangentially across the inlet opening 11 of the housing as is shown in FIG. 5. A greater or lesser arc may be employed. The lower corner 69 of the leading plate is generally just spaced from the outer edge of the vanes and this sheet of air 54 moves against the arcuate surface 36 on the leading outer surface of the vanes and this air then follows this rounded edge by virtue of wall attachment effect to exert a sweeping action on the outer end of the vane to either prevent any chips or particulate material from contacting the end of the vane or if such material contacts and clings beyond the lower edge 52 of the baffle, to then remove such particles before the end of the vane comes into sealing relationship with the leading edge of the land 34. The surface 36 preferably has a radius equal to the thickness of the vane. It may be less or the arc may be less than 90° or both.

In the embodiment of the invention shown, the nozzle 17 is positioned just in front of the leading edge 38 of the land 34 and is mounted on the housing by bolts (not shown). The upper end 75 of the nozzle is a generally horizontal surface and to prevent particulate material from remaining on this upwardly facing surface, the baffle arrangement includes a second plate 76 fastened to the leading side 21 of the hopper 24 and extending downwardly and to the right, and across and beyond the top of the nozzle, so as to deflect any particulate material falling through the hopper away from the top of the nozzle.

The air is cooled as it expands through the nozzle resulting in a general contraction in its volume. If desired, the nozzle plates 55 and/or 56 can be heated by means not shown such as an electric coil attached to the surface of the plates or other forms of heat so as to add energy to the air as it passes through the nozzle preventing its temperature from being substantially lowered and thus resulting in a substantial increase in the air velocity coming from the nozzle.

Figure 6:
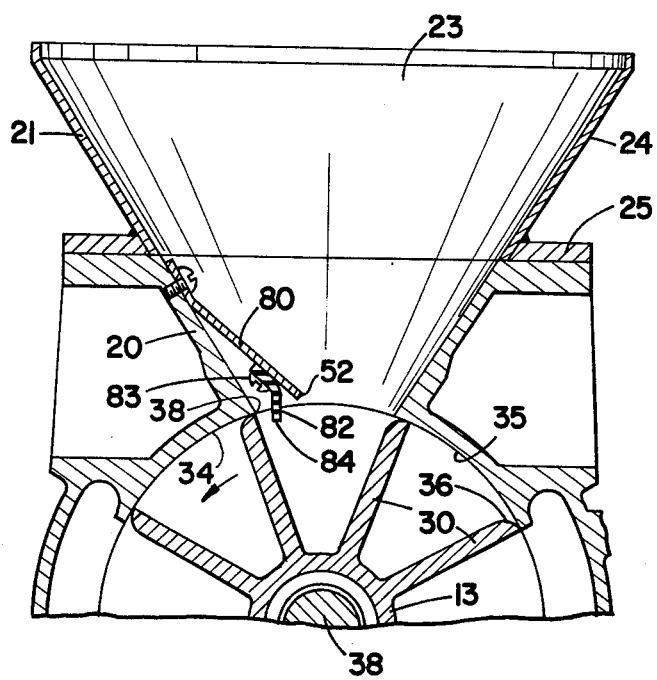
FIG. 6 is a fragmentary view similar to FIG. 1 but showing an alternative embodiment of the invention.

FIG. 6 shows an alternative embodiment of the invention wherein a baffle 80 is fastened to the leading side 20 of the housing hopper and extends to a point 52 spaced in front of the leading edge 38 of the land 34 so as to deflect any particles and provide a time period in the movement of the vanes during which no particulate material impinges on the vane ends. Mechanical means in the form of a wiper blade 82 formed of a sheet of heavy flexible plastic is fastened to the under surface of the baffle by means of screws 83. The lower edge 84 of the wiper blade extends at least below or inside of the arc of movement of the outer edges of the vanes. With the leading outer corner of the vanes rounded as shown at 36, any material which would impinge on the outer ends of the vanes is inhibited from clinging thereto making the job of the wiper blade that much easier. The mechanical means could also be a brush either fixed or rotating.

Figure 7:
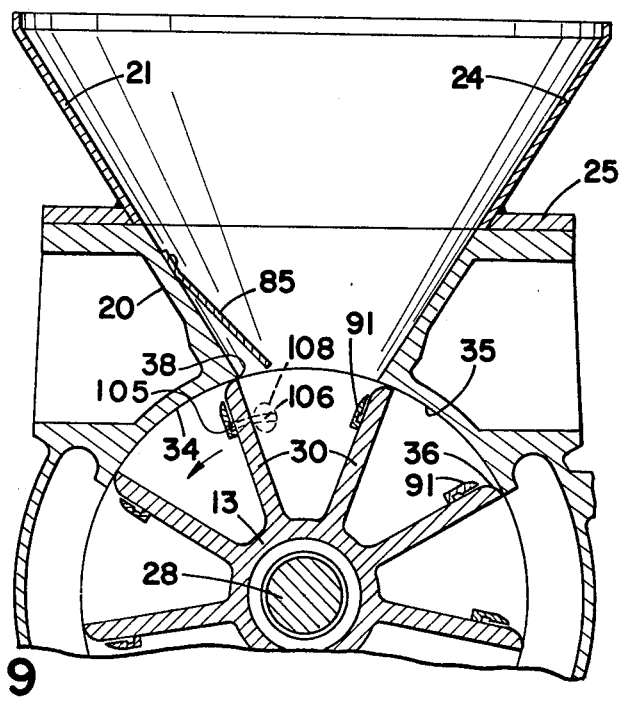
FIG. 7 is a view similar to FIG. 6 but showing a still further alternative embodiment of the invention.

FIG. 7 shows a still further alternative embodiment of the invention. In this embodiment, a baffle 85 is fastened to the leading side 20 of the housing inlet opening and extends downwardly diverging from this leading side to a point spaced from the leading edge 38 of the land 34 and just radially outwardly of the arcuate path of movement of the outer ends of the vanes.

Figure 8:
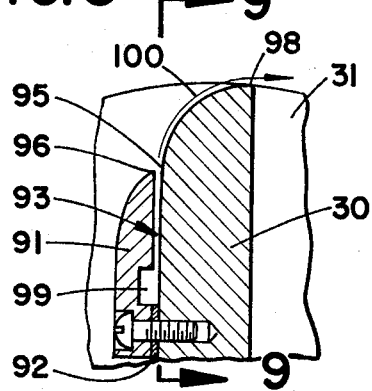
FIG. 8 is an enlarged cross-sectional view of the rotor vane end shown at FIG. 7; and, FIG. 9 is an enlarged cross-sectional view of FIG. 8 taken approximately on the line 9—9 thereof.
Figure 9:
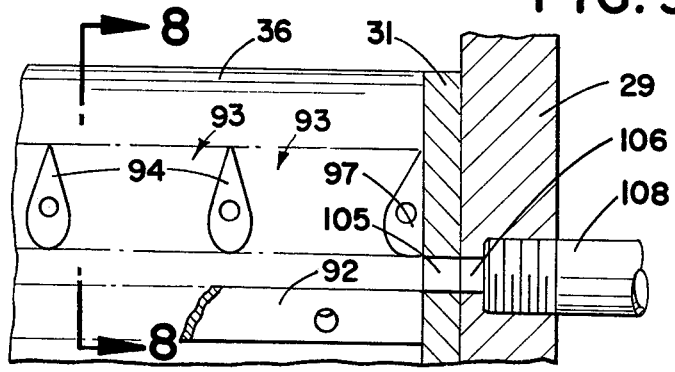

A nozzle arrangement is provided on the leading surface of each vane 30. Such nozzle may take a number of different forms but in the embodiment shown in FIGS. 8 and 9, is comprised of a flat axially extending plate 91 spaced from the leading surface of the vane by a shim 92 along its inner radial edge to form a radially outwardly extending nozzle passage 93 with a radially outwardly facing discharge opening 95. The shim 92 has a pair of radial legs 97 at its axially opposite ends which legs and a plurality of intermediate shims 94 are shaped as in the embodiment of FIG. 3 to provide the maximum conversion of pressure energy to velocity energy.

The outer radial edge of the plate 91 tapers to an edge 96 and is spaced from the outer end 98 of the vane as shown generally by the radius of the curvature of the vane end. Plate 91 has a groove 99 in its vane-facing surface forming a manifold for the nozzle passage 93. Air under pressure in the manifold flows radially outwardly through the nozzle passage at a high velocity. The air exits the nozzle outlet 95 in the form of a thin sheet 100 and by attachment effect it follows the radiused end of the vane to have a generally tangential flow as it leaves the end of the vane. Such flow of air over the vane end sweeps away any particulate material clinging to the outer end of the vane.

To supply air to the manifold 99, passages 105, 106 are provided in the end wall 31 of the rotor and the side wall 29 of the housing. The passage 106 is arcuate and so positioned as to be aligned with passage 105 as the vanes move past the baffle end to the leading edge of the land 34. Passage 106 communicates to a source of air pressure (not shown) through pipe 108.

With this arrangement, air is allowed to flow through this housing passage 106 continuously or is cycled on and off synchronously with the movement of the vanes.

It will thus be seen that an arrangement has been provided for a rotary air lock including means for preventing the impingement of particles of material on the end of each rotor vane for a slight distance before the vane comes in contact with the sealing land in combination with means for exerting a removing force on any particles which may cling to the end of the vane after such vane end passes the baffle and before it comes in contact with the sealing land.

In the specification, for simplicity, the inlet and outlet openings have been referred to as upwardly and downwardly facing and the granular material as moving downwardly through the air lock. Obviously other orientations of the air lock would come within the meanings of these descriptive words.

The invention has been described with reference to preferred embodiments. Obviously modifications and alterations will occur to others upon a reading and understanding of this specification and it is the intention to include all such modifications and alterations insofar as they come within the scope of the appended claims.

Having thus described the invention, it is claimed:

1. A method of preventing particles of material being handled by a rotary vane air lock, having an inlet opening and a discharge opening and vane ends sealingly engaging with leading and trailing lands on the air lock housing, from coming between the vane ends and the lands as the vanes rotate, comprising the steps of: covering the said end of each vane for a portion of its arc of movement across said inlet opening just before the vane end comes into contact with the leading land; and, in such movement portion of the vane end just before it contacts the leading land, exerting a removing force on any particles which may be clinging to the vane end.

2. The method of claim 1 wherein the step of exerting the removing force comprises: flowing a thin sheet of high velocity air across the end of the vane.

3. A method of preventing particles of material being handled by a rotary vane air lock, having an inlet opening and a discharge opening and vane ends engaging with leading and trailing lands on the air lock housing, from coming between the vane ends and the lands as the vanes rotates, comprising the steps of: covering the said end of each vane for a portion of its arc of movement across said inlet opening just before the vane end comes into contact with the leading land; and, in such movement portion of the vane end just before it contacts the leading land, exerting a removing force on any particles which may be clinging to the vane end by flowing a thin sheet of high velocity air radially outwardly of the vane on its leading side and across the vane end.

4. A method of preventing particles of material being handled by a rotary vane air lock, having an inlet opening and a discharge opening and vane ends engaging with leading and trailing lands on the air lock housing, from coming between the vane ends and the lands as the vanes rotate, comprising the steps of: covering the said end of each vane for a portion of its arc of movement across said inlet opening just before the vane end comes into contact with the leading land; and, in such movement portion of the vane end just before it contacts the leading land, exerting a removing force on any particles which may be clinging to the vane end by flowing a sheet of high velocity air against the leading side of the vane adjacent the end thereof and then across the vane end.

5. The method of claim 1 wherein the exertion of the said removing force comprises: the step of exerting a mechanical wiping action on the vane end.

6. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading land for preventing impingement of particulate material on the vane ends; and second means for exerting a removing force on any particles which might cling to the vane ends after the said vane ends pass the first mentioned means but before they engage the leading land.

7. The improvement of claim 6 wherein said first means comprises: a baffle member extending across a portion only of the inlet opening at the leading side thereof.

8. The improvement of claim 6 wherein said first means comprises: the leading edge of the leading land being spaced circumferentially from the leading side of the inlet opening in the direction of rotation of the rotor.

9. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading land for preventing impingement of particulate material on the vane ends; and second means for exerting a removing force on any particles which might cling to the vane ends after the said vane ends pass the first mentioned means but before they engage the leading land, said first means comprising a baffle member extending across the leading side of the inlet opening radially outwardly of the path of movement of the vane ends, and said second means comprising a nozzle capable of producing a thin sheet of high velocity air positioned between said baffle member and the leading land arranged to project a thin sheet of high velocity air across each vane as and/or after it passes said baffle member.

10. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading land for preventing impingement of particulate material on the vane ends, and second means for exerting a removing force on any particles which might cling to the vane ends after the said vane ends pass the first mentioned means but before they engage the leading land, the leading outer edge of each vane being radiused and a nozzle being arranged to provide a thin sheet of high velocity air impinging on said radius as each vane approaches the nozzle.

11. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading land for preventing impingement of particulate material on the vane ends, and second means for exerting a removing force on any particles which might cling to the vane ends after the said vane ends pass the first mentioned means but before they engage the leading land, said second means comprising a nozzle having an elongated but thin outlet opening with an axial width generally equal to the axial length of said vanes and a passage having a generally radially extending axis, the leading elongated side of the nozzle outlet being radiused whereby high velocity air emanating from said outlet is directed in a tangential direction against the ends and opposite to the direction of movement of said vanes.

12. The improvement of claim 11 wherein said passage includes means shaping same to provide high conversion of air pressure energy to air velocity energy.

13. The improvement of claim 11 wherein the leading outer edge of each vane is radiused.

14. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading land for preventing impingement of particulate material on the vane ends, and second means for exerting a removing force on any particles which might cling to the vane ends after the said vane ends pass the first mentioned means but before they engage the leading land, said second means including flexible means in the path of movement of the vane ends.

15. The improvement of claim 14 wherein the leading outer corners of said vanes are radiused.

16. In a rotary vane air lock for delivering granular material to a chamber under pressure, the air lock being comprised of: a housing having an inlet opening and a discharge opening, a vaned rotor rotatable in the housing, and the housing having a leading and a trailing land surface on the leading and trailing sides of the inlet opening adapted to be in sealing relationship with the ends of the vanes as the vane rotor rotates, the improvement which comprises: first means spaced from the leading land in a direction opposite to the direction of rotation of the rotor and located just before the leading-land for preventing impingement of particulate material on the vane ends, and second means for exerting a removing force on any particules which might cling to the vane ends after the said vane ends pass the first mentioned means but before they engage the leading land, said second means comprising a nozzle on the leading side of each vane so arranged as to project a thin sheet of air across its outer end in a direction opposite to the direction of movement of said vanes.

17. The improvement of claim 16 wherein said outer end is radiused and the outlet of said nozzle is adjacent said radiused end.

* * * * *